Oct. 24, 1939.  H. ADKINSON  2,176,984
LUG TYPE SOIL PACKER
Filed March 28, 1938

INVENTOR,
Harold Adkinson.
BY Hovey & Hamilton,
ATTORNEYS

Patented Oct. 24, 1939

2,176,984

UNITED STATES PATENT OFFICE 2,176,984

LUG TYPE SOIL PACKER

Harold Adkinson, Salina, Kans.

Application March 28, 1938, Serial No. 198,363

5 Claims. (Cl. 55—24)

This invention relates to improvements in lug type soil packers and particularly to a soil packer whereby spaced apart depressions are formed in the soil being worked without pulverizing the soil therebetween.

In the semi-arid areas it is desirable to conserve the rainfall and also to maintain the top soil in more or less lump form to prevent as much as possible, wind erosion. Heretofore the soil packers have been so constructed and operated as to pulverize substantially the entire surface soil, thus making it very susceptible to wind erosion and to pack the soil with closely associated lugs so constructed as to stir the soil as they pass therethrough.

The object of the present invention is the provision of a lug type soil packer constructed to overcome these objections and to provide means whereby spaced apart depressions may be formed in the soil without interfering with the condition of the soil between the depressions or holes.

Another object of the present invention is the provision of a soil packer having novelly constructed lugs so positioned on the carrying discs as to enter the soil in a more or less horizontal position and to leave the same in substantially vertical position thereby producing a definitely formed depression which is adapted to receive the rainfall and direct it to the sub-soil.

Other objects of this invention are economy and simplicity of construction and economy of operation. With these, as well as other objects which will appear during the course of the following specification, reference will now be had to the drawing wherein.

Figure 1:
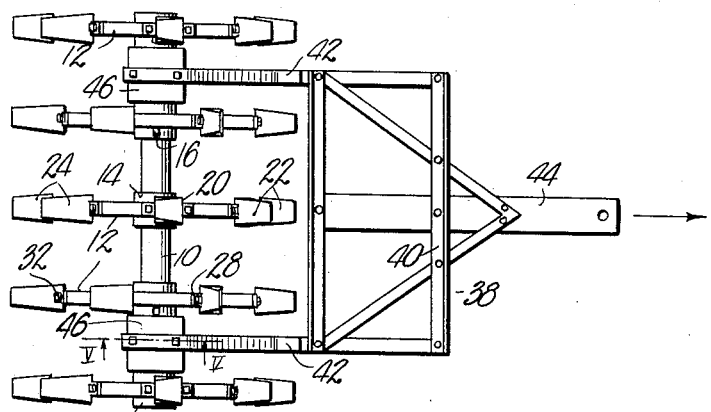
Figure 1 is a plan view of a lug type soil packer embodying this invention.

Throughout the several views, like reference characters designate similar parts and the numeral 10 indicates a tubular shaft on which is mounted in spaced apart relation, a series of disc shaped members 12 having hubs 14.

Pins 16 are provided to secure members 12 to shaft 10 so that they will maintain fixed relative positions during the operation of the machine. Each member 12 is flattened at spaced apart intervals along its periphery as shown at 18 to receive tamping lugs 20. Lug 20 is preferably cast and hardened in some suitable manner to resist wear and to prevent breakage while in use. These lugs 20 when in the operative position, have their one face 22 disposed in a plane passing through the axis of shaft 10 and the opposite face 24 inclined thereto so as to produce a wedge shaped body 26.

The base of lug 20 is provided with oppositely disposed ears 28 with openings 30 to receive bolts 32 which are adapted to pass into T-slots 34 formed in the peripheral portion of member 12 and engage nuts 36, whereby the lugs are securely attached to member 12. Nuts 36 are preferably square so that they will be held against rotation during the tightening operation.

Figures 3, 4, 5:
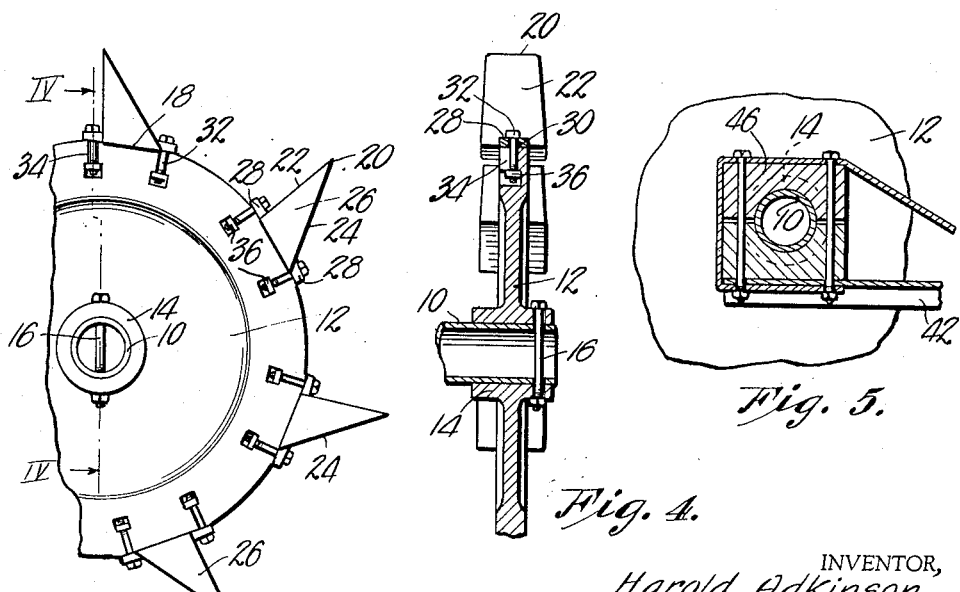
Fig. 3 is an enlarged fragmentary view of one of the packing wheels mounted on the shaft.
Fig. 4 is a sectional view taken on line IV—IV of Fig. 3.
Fig. 5 is an enlarged sectional view taken on line V—V of Fig. 1.

It will be noted that the lugs 20 are outwardly tapered as clearly shown in Fig. 4, so as to be easily drawn from the soil without interfering with the shape of the depression formed therein. The lugs on adjacent members 12 are in staggered relation to facilitate proper spacing of the depressions formed in the soil.

Hitch 38 for the packer comprises a frame 40 having spaced apart arms 42 and a center tongue 44, by means of which the packer may be attached to a tractor or any other suitable power unit. Each arm 42 is provided with a journal box 46 adapted to receive shaft 10 for rotation therein. Referring to Fig. 1, it will be noted that the journal boxes 46 are positioned between adjacent disc members 12 to preclude longitudinal movement of shaft 10 relative to frame 38. This same hitch might also be used with packers having more discs than shown in this drawing.

Figure 2:
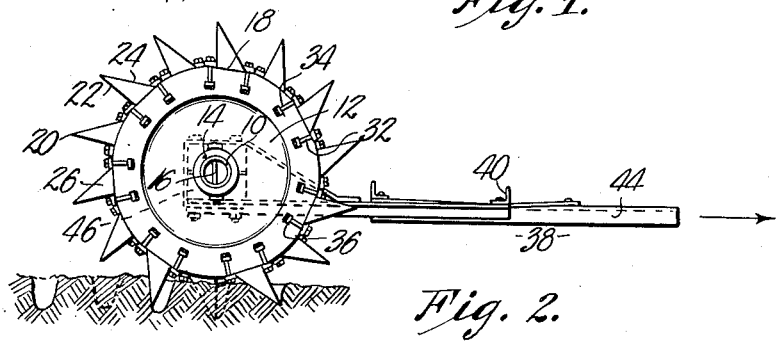
Fig. 2 is a side elevation of the soil packer.

A very important feature of this invention is the proper positioning of the packing lugs relative to the direction of travel of the machine. This is clearly shown in Figs. 1 and 2 wherein it will be noted that the lugs enter the ground in more or less a horizontal position and move therefrom while in a substantially vertical position, thereby producing a definitely formed depression for the reception of the surplus rainfall which will eventually soak into the sub-soil.

Due to the fact that the lugs 20 present a relatively large bearing surface for supporting the packer, disc member 12 will not contact the surface of the earth, thus insuring uninterrupted surface intermediate the depressions. The distance between the discs is relatively great so that trash positioned on the surface of the ground being worked will not collect on the machine but will be in most instances, partially embedded in the soil so as to extend thereabove and present barriers which will function to prevent erosion.

When this packer is used on stubble ground, it will carry some of said stubbles down into the depressions to serve as means for holding the adjacent earth and to cause the embedded portion thereof to deteriorate and fertilize the soil. The thickness of the periphery of discs 12 are intended to be much narrower than the lugs so that said lugs will extend outwardly transversely thereof.

As stated above, it is intended that this packer while in operation, shall ride on and be entirely supported by the several lugs in contact with the soil. In actual practice, it has been found that it is desirable to so space the packing lugs that the depressions formed in the ground will be about 12 inches from center to center. This will allow for sufficient depressions to take care of the normal rainfall and will leave a sufficient ground surface in its natural state to preclude undue air erosion.

Having thus described the invention, what is claimed as new and desired to be secured by Letters Patent is:

1. A soil tamper comprising a shaft; a series of discs secured in spaced apart relation to said shaft and adapted to rotate therewith; and a series of lugs carried in spaced apart relation at the periphery of each of said discs, each of said lugs being of greater thickness than said discs and extending transversely beyond the opposite sides thereof and having a sharpened outer edge.

2. A soil tamper comprising a shaft; a series of spaced apart discs secured in spaced apart relation to said shaft to rotate therewith; each of said discs having a series of spaced apart packing lugs removably attached to its periphery and adapted to extend therebeyond and at each side thereof, each of said lugs being so constructed and related to said disc as to present a substantially horizontal surface to the surface of the ground to be tamped as the lug enters the soil, and to leave the ground when in a substantially vertical position.

3. A soil tamper comprising a shaft; a series of relatively thin, hubbed discs secured in spaced apart, concentric relation to said shaft; a series of tamping lugs, removably secured in spaced apart relation on the periphery of each of said discs and extending beyond each side thereof; lugs on adjacent discs being arranged in offset relation; and a hitch frame journaled to said shaft adjacent its opposite ends.

4. A soil tamper comprising a shaft; a series of relatively thin, hubbed discs secured in spaced apart, concentric relation to said shaft; a series of relatively wide tamping lugs, removably secured in spaced apart relation on the periphery of each of said discs the lugs on adjacent discs being in offset relation; said lugs each having a surface in the radial plane passing through the axis of said shaft, and a planar surface intersecting said first named surface whereby a lug is formed of V-shape in the plane of said disc; and a hitch frame journaled to said shaft.

5. A soil tamper comprising a shaft; a series of relatively thin, hubbed discs secured in spaced apart, concentric relation to said shaft; a series of tamping lugs, removably secured in spaced apart relation on the periphery of each of said discs and extending transversely beyond both sides thereof; said lugs each having a surface in the radial plane passing through the axis of said shaft and a planar surface intersecting said first named surface whereby a lug is formed of V-shape in the plane of said disc; and the side surfaces of said lug being slightly outwardly converging to present a tapered lug transversely of the major plane of the disc.

HAROLD ADKINSON.